United States Patent [19]

Hutchinson et al.

[11] 3,743,775

[45] July 3, 1973

[54] DATA DEMODULATOR APPARATUS

[75] Inventors: William M. Hutchinson, Corona Del Mar; Richard W. Middlestead, El Toro, both of Calif.

[73] Assignee: Collins Radio Company, Dallas, Tex.

[22] Filed: Jan. 12, 1972

[21] Appl. No.: 217,122

[52] U.S. Cl. ............ 178/88, 178/66 R, 178/69.5 R, 325/320, 329/110, 329/123

[51] Int. Cl. ....... H04l 7/02, H04l 27/16, H03d 3/00

[58] Field of Search .................... 178/66 R, 69.5 R, 178/88; 325/45, 320; 329/110, 123, 134

[56] References Cited

UNITED STATES PATENTS 3,674,934 7/1972 Gooding et al. .................... 178/88

*Primary Examiner*—Charles E. Atkinson
*Assistant Examiner*—R. Stephen Dildine, Jr.
*Attorney*—Bruce C. Lutz et al.

[57] ABSTRACT

A MARK/SPACE data demodulator for detecting frequency shift keyed MARK/SPACE incoming signals wherein the reference frequency is obtained at the receiver by detecting the difference in frequency between the MARK and the SPACE frequency signals and utilizing this frequency difference in the data detection process.

8 Claims, 5 Drawing Figures

DATA DEMODULATOR APPARATUS

THE INVENTION

The present invention is generally related to electronics and more specifically related to demodulating circuitry. Even more specifically, the present invention is related to a demodulator for demodulating minimum shift keyed signals.

Minimum shift keying is discussed in a basic U.S. Pat. to Doelz et al 2,977,417 issued Mar. 28, 1961 and assigned to the assignee of the present invention. An improved receiver for minimum shift keying (MSK) is described in a Renshaw U.S. Pat. No. 3,146,307 issued Aug. 25, 1964 and also assigned to the assignee of the present invention. The receivers in the above described inventions, however, contained relatively complicated clock detection or synchronizing circuits and the circuitry could not always synchronize with the incoming data because of frequency delays and distortions in the signal between transmitter and receiver causing a frequency shift and/or phase shift in the arriving signal. When high carrier frequencies are utilized, these shifts can be quite substantial.

The present invention utilizes the difference between the MARK and SPACE frequencies of a carrier to provide the reference or clock signal at the receiver. A high carrier frequency substantially simplifies the detection circuitry.

It is therefore an object of the present invention to provide an improved MSK receiver over that supplied in the prior art.

Other objects and advantages of the present invention may be ascertained from a reading of the specification and appended claims in conjunction with the drawings wherein:

To describe the data demodulator disclosure it is necessary to review briefly the MSK modulation technique defined in the Doelz patent. The Doelz modulator is shown in basic format in FIG. 1 where the output signal, $e_o$, can be considered either as the quadrature sum of two signals of the form, $$e_o = X + Y \qquad 1$$

where $$X = d_1 \cos(\omega_m t) \cos(\omega_c t),$$
$$Y = d_2 \sin(\omega_m t) \sin(\omega_c t),$$
$$\omega_m = 2\pi R/4$$
$$R = \text{data rate}$$
$$\omega_c = \text{carrier frequency}$$

or as a frequency shift keyed (FSK) signal at a frequency $(\omega_c+\omega_m)$ if $d_1$ is not equal to $d_2$ and $(\omega_c-\omega_m)$ if $d_1$ equals $d_2$. For the second form $$e_o = (d_1+d_2)/2 \cos(\omega_c-\omega_m)t + (d_1-d_2)/2 \cos(\omega_c+\omega_m)t \qquad 2$$

Figure 4:
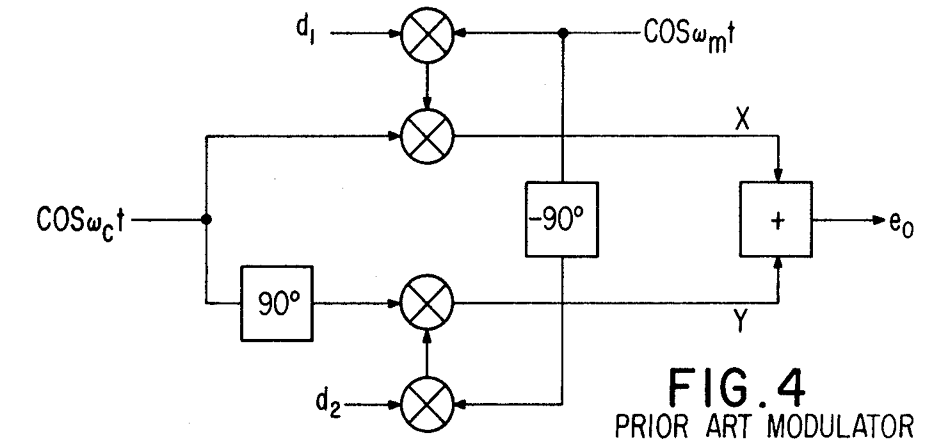
FIG. 4 is a simplified illustration of a prior art modulator.

In these expressions $d_1$ and $d_2$ are either plus 1 or minus 1 depending on the modulated binary data associated with each channel, $x$ and $y$. The data bits, $d_1$ and $d_2$, have transitions from (+1) to (−1) or vice versa, which occur at the same instant that the values of $\cos(\omega_m t)$ and $\sin(\omega_m t)$, respectively, equal zero. It can be seen from the above expressions that $d_1$ and $d_2$ can be transmitted directly on the $x$ and $y$ channels; or that they can be digitally combined and sent as FSK modulation; or that, if the FSK modulation is directly applied from the input data, and a Doelz MSK receiver is used which provides $x$ and $y$ channel outputs, that those outputs can be digitally combined to yield the FSK input data. This latter case, where the input data is direct FSK modulation (such as may be provided in accordance with a copending patent application to one of the present inventors, Hutchinson, filed Nov. 17, 1971, Ser. No. 199,706) and assigned to the same assignee of the present invention) and where the receiver is an improved version of the Doelz patent, is the subject of this application. The present inventive concept applies equally well, however, to modulators identical to that of the Doelz patent and FIG. 4 with minor simplifications noted below.

It is well known that the optimum receiver configuration for a signal defined as $e_o$ above, which is perturbed by noise, can be defined as follows:

1. For the x channel multiply the received signal by $x$ with $d_1 = 1$ and integrate the product from the beginning to the end of each bit interval of $d_1$, that is over a half cycle of $\cos(\omega_m t)$ between instants when $\cos(\omega_m t) = 0$. The contribution to the integral from the $y$ channel will be zero.
2. For the $y$ channel repeat the process replacing $x$ with $y$, $\cos(\omega_m t)$ with $\sin(\omega_m t)$, $d_1$ with $d_2$.
3. The values of the integrals are determined to be positive or negative, and the sign of the values, plus or minus, determines the received binary digit (bit).
4. For determination of the bits transmitted by direct FSK modulation compare successive values of the detected $d_1$ and $d_2$; if they are different, the higher frequency was received, $\omega_m+\omega_c$, if the same, the lower frequency was received $\omega_c$—exclusive $_m$. A logic operation known as "exclusive or" performs this comparison. This is necessary where direct FSK modulation is employed but not for the $x$ and $y$ channel modulation described by Doelz. It is to be noted that the $x$ and $y$ channel modulation may yield inverted data due to a 180° phase ambiguity in the derivation at the receiver of the carrier frequency, $\omega_c$. This problem is avoided in the detection method using the direct FSK modulation and the "exclusive or" detection at the receiver, since there can be no detection ambiguity between two frequencies.

The improved detection technique is described below in conjunction with FIG. 5. Its advantages are that (1) mixers using square wave inputs are used for the multiplication function instead of linear multipliers and (2) both bit timing and carrier phase recovery are jointly accomplished in a pair of simple phase lock loop circuits, well known in the art, which follow a square law device. The second advantage results from deriving phase lock on the upper and lower shift frequencies, $(\omega_c\pm\omega_m)$, rather than the carrier, $\omega_c$. Advantage is then taken of the fact that $(\omega_c+\omega_m)$ minus $(\omega_c-\omega_m)$ equals $2\omega_m$, a frequency equal to one-half the total bit rate, so phased that the zeros of this wave coincide with the bit transitions.

For the Doelz receiver, the received signal is multiplied by complex signals of the form $\cos(\omega_m t)\cos(\omega_c t)$ which have a sinusoidal envelope. Depending on the bandwidth of the radio receiving system, some degradation is realized if the sinusoidal envelope weighting is not preserved. This requires a linear mixer. Furthermore the Doelz receiver requires separate and differently implemented detection processing to recover the carrier, $\omega_c$, and the timing, $\omega_m$. These difficulties are avoided in the present implementation by recognizing that $$\cos(\omega_m t)\cos(\omega_c t) = \tfrac{1}{2}\,[\cos(\omega_c+\omega_m)t + \cos(\omega_c-\omega_m)t] \quad 3$$

and that $$\sin(\omega_m t)\sin(\omega_c t) = \tfrac{1}{2}\,[\cos(\omega_c+\omega_m)t - \cos(\omega_c-\omega_m)t] \quad 4$$

This allows the complex multiplying signal for the $x$ and $y$ channels to be expressed as the sum of two constant envelope signals. Furthermore the multiplying signals for both the $x$ and $y$ channels are available as the sum and difference of the same two basic frequencies.

The frequency of the recovered timing signal is the difference frequency between the two basic frequencies. It is significant that any detection ambiguity of 180° in either of the two frequencies causes jointly a reversal of both the detection timing and the detection summing (addition and subtraction) so that the correct "dump" and "store" timing is always applied to the appropriate integrator and sign detect channel.

Figure 5:
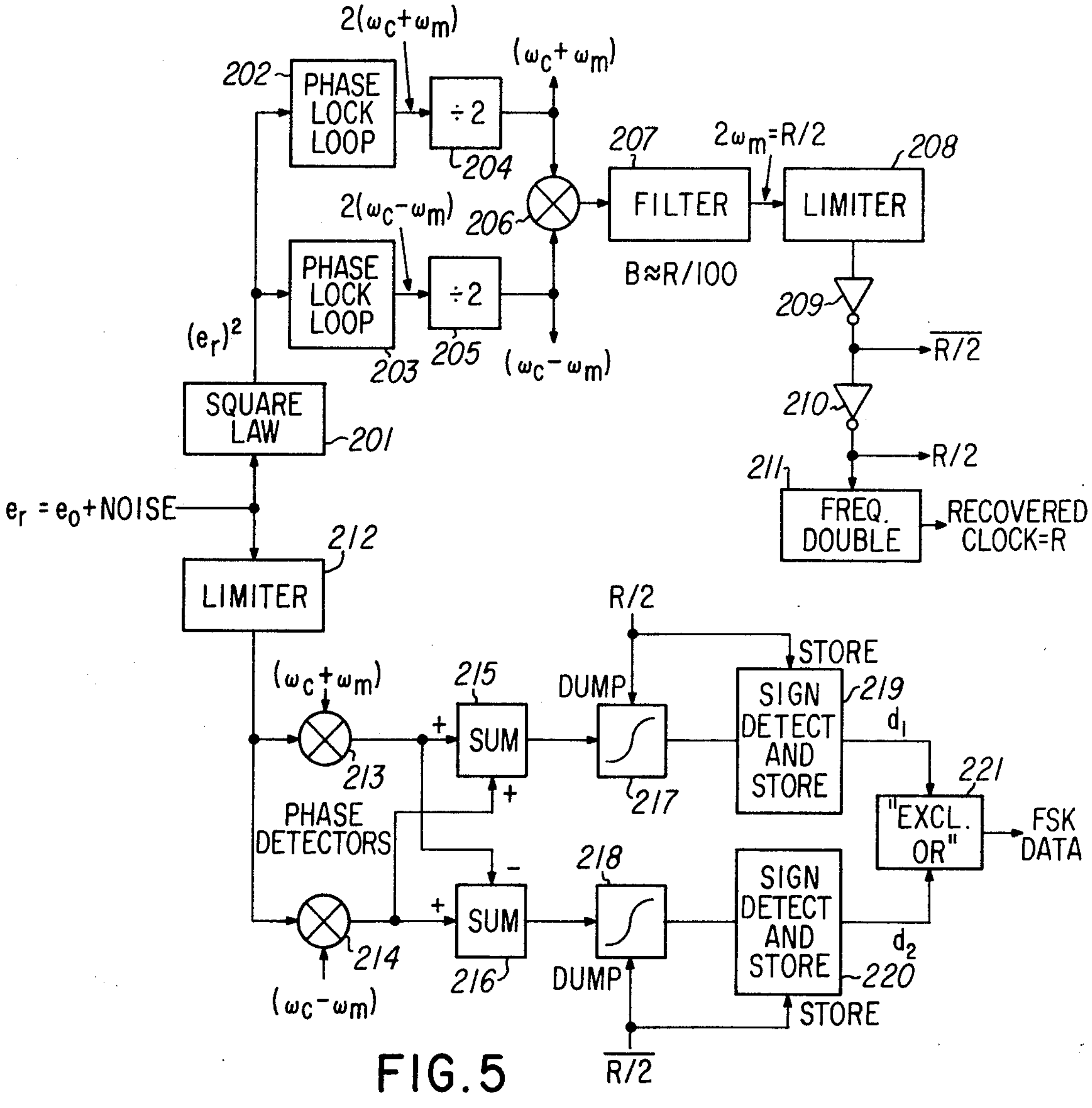
FIG. 5 is a basic block diagram of the circuit shown in more detailed form in FIG. 1.

The operation of this MSK receiver is explained with FIG. 5. The input signal, $e_r$, is assumed to be a MSK waveform perturbed by noise. To recover timing and phase reference for the two shift frequencies, $(\omega_c\pm\omega_m)$, the signal is passed through square law device 201. This acts as a frequency doubler and, in the presence of a data modulated signal, insures that continuous wave spectral components of $2(\omega_c\pm\omega_m)$ exist at its output. These spectral components are regenerated by the phase lock loops 202 and 203. The outputs of 202 and 203 are frequency divided by two in blocks 204 and 205 and are the phase reference signals used in phase detectors 213 and 214. The phase lock loop bandwidths should be as narrow as possible considering requirements on acquisition time and frequency error. The outputs of 204 and 205 are mixed in 206, and the difference frequency is selected by narrow band filter 207, tuned to $2\omega_m-R/2$. The bandwidth of 207 should be as narrow as possible considering component stability. The filter must be accurately tuned to avoid an undesired phase shift at the frequency R/2. The output of 207 is hard-limited to be a square wave in 208 and provided in true, R/2, and inverted, $\overline{R/2}$, form by logic inverters 209 and 210. The output of 210 is frequency doubled, either logically or with a tuned circuit, in 211 and appears as the data rate clock, R. Functions 201 through 211 complete the carrier and timing recovery circuits. Various alarm and monitor functions not shown can be included.

The received signal, $e_r$, is processed to detect the modulated data using the recovered phase reference carriers, from 204 and 205, and the recovered timing from 209 and 210. The signal, $e_r$, is hard-limited in 212 to remove amplitude variations and thereby simplify the design of the following circuitry. The output of 212 is mixed in phase detectors 213 and 214 with the outputs of 204 and 205 to provide d-c components representative of the data modulation, combined with noise and unwanted frequency components. The phase detector outputs of 213 and 214 are added and subtracted in the sum circuits 215 and 216. The outputs of 215 and 216 are the received signal multiplied by the correct weighting functions, $\cos(\omega_m t)\cos(\omega_c t)$ and $\sin(\omega_m t)\sin(\omega_c t)$. This can be seen from the equation 5 below which is an expansion of equation 2 and is a trigonometric identity for the weighting function when the modulation, $d_1$ and $d_2$, are assumed as unity.

$$e_o = d_1/2\,\cos(\omega_c-\omega_m)t + d_1/2\,\cos(\omega_c+\omega_m)t + d_2/2\,\cos(\omega_c-\omega_m)t - d_2/2\,\cos(\omega_c+\omega_m)t \quad 5$$

The output of the sum circuits 215 and 216 are integrated over the proper interval in 217 and 218 in accordance with the optimum detection processing. The integration removes all unwanted frequency components and most of the noise. The interval of integration is fixed by the "dump" signals from 209 and 210. An instant, very short compared to a bit interval, before the integrator is "dumped" (reset to zero) the signs of the outputs of 217 and 218 are clocked into binary storage devices in the signa detect and store circuits 219 and 220. The signs are stored until replaced by the next "store" clock from R/2 and $\overline{R/2}$. The outputs of 219 and 220 are the data $d_1$ and $d_2$. For systems using direct FSK modulation, the outputs of 219 and 220 are determined to be either the same or different in the logic "exclusive or" 221. It can be recognized that $d_1$ and $d_2$ from 219 and 220 are binary levels which remain constant for two bit intervals. Since $d_1$ and $d_2$ are offset by one bit interval, their comparison at the output of 221 switches each bit interval synchronously with positive transitions of the recovered clock, R, from 211. The functions 212 through 221 complete the demodulation of data from the received signal $e_r$.

As indicated previously, the broad block diagram of FIG. 5 does not include some of the details desirable in a practical embodiment of the invention. Thus, a more detailed presentation along with the appropriate waveforms is presented in FIGS. 1–3.

Figure 1:
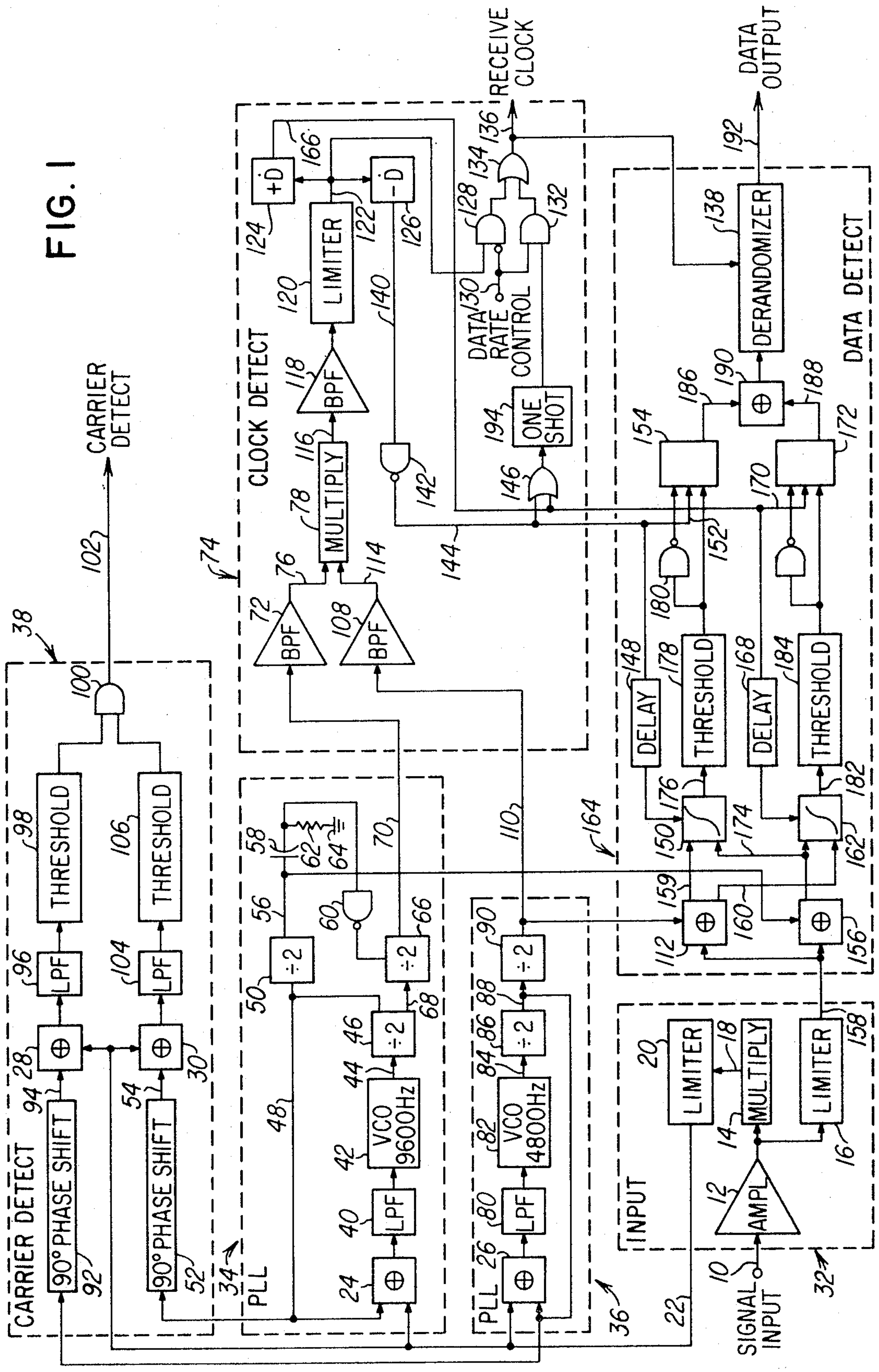
FIG. 1 is a detailed block diagram of one embodiment of the invention.

In FIG. 1 a lead 10 supplies an input signal to an amplifier 12 whose output is connected to a multiplying circuit 14 and to an amplitude limiter 16. The multiplier circuit 14 takes the input signal and squares or doubles it and provides an output signal, which is doubled in frequency, on lead 18 which is connected to an input of an amplitude limiter 20. Amplitude limiter 20 provides an output on lead 22 to the inputs of two exclusive OR or multiplying circuits 24 and 26. This signal on lead 22 is also supplied to a pair of exclusive OR or multiplying circuits 28 and 30.

The blocks 12, 14, 16, and 20 are part of the input circuitry generally designated within dash lines as 32. The exclusive OR circuits 24 and 26 are in separate phase locked loop circuits generally designated as 34 and 36, respectively, and contain other blocks. The multiplying circuits 28 and 30 are contained in a dash line block 38 which is a carrier detection circuit.

The output of multiplying circuit 24 is supplied through a low-pass filter 40 to a VCO (voltage controlled oscillator) 42. VCO 42 has a nominal frequency of 9,600 Hz. The output of VCO 42 is supplied on a lead 44 to a divide by 2 flip-flop 46. Flip-flop 46 has an output 48 which provides a second input to multiplying circuit 24. Lead 48 also goes to an input of a second flip-flop 50 and to a 90° phase shifting or delay circuit 52. The output of the delay circuit 52 is supplied on a lead 54 to the multiplying circuit 30. The output of flip-flop 50 is supplied on a lead 56 through a capacitor 58 to an input of a NAND (used as an inverter) gate 60 and through a resistor 62 to ground or reference potential 64. An output of NAND gate 60 is supplied to a reset input of a flip-flop 66 having a clock input from another output or flip-flop 46 on a lead 68. An output of flip-flop 66 is supplied on a lead 70 to a bandpass filter (BPF) 72 in a clock detection circuit generally designated within dash lines as 74. An output of bandpass filter 72 is supplied on a lead 76 to a multiplying circuit 78.

Returning now to multiplying circuit 26, it will be noted that the output of this multiplying circuit is supplied through a low-pass filter 80 to a second VCO 82 having a nominal frequency of 4,800 Hz. An output of VCO 82 is supplied on a lead 84 to a divide by 2 flip-flop 86 having an output lead 88. Lead 88 is supplied as a second input to multiplying circuit 26 and also as an input to a further divide by 2 flip-flop 90 and to a 90° phase shifting or delay circuit 92. An output of phase shifter 92 is supplied on a lead 94 as a second input to multiplying circuit 28. The output of multiplying circuit 28 is supplied through a low-pass filter 96 and a threshold detector 98 to an input of AND gate 100 whose output is supplied on lead 102 to provide an indication when the system is locked to a frequency and is operable to correctly decode signals.

An output of multiplier 30 is supplied through a low-pass filter 104 and a threshold detector 106 to a second input of AND gate 100.

An output of divide by 2 circuit 90 is supplied to a bandpass filter 108 via a lead 110 and is also supplied as an input to an exclusive OR gate 112. An output of band-pass filter 108 is supplied on a lead 114 to a second input of multiplier 78. An output of multiplier 78 is supplied on a lead 116 to a band-pass filter 118 whose output is supplied through an amplitude limiter 120 to a lead 122. Lead 122 is supplied to the input of positive and negative differentiating circuits 124 and 126, respectively. Lead 122 is also supplied to an input of an AND gate 128 which has an inverting input connected to a data rate control lead 130. Lead 130 is also supplied to an input of an AND gate 132. The outputs of the two AND gates 128 and 132 are supplied through an OR gate 134 to a receive clock output lead 136. Lead 136 is also supplied to a clock input of a data derandomizer 138. An output of negative differentiating circuit 126 is supplied on a lead 140 to a NAND gate 142 which operates to invert the signal and supply an output on a lead 144. The lead 144 is supplied to an OR gate 146 and also to an input of a delay circuit 148 whose output is connected to an input of an integrating circuit 150. Lead 144 is also supplied on a lead 152 to a clock input of a threshold storage circuit 154. The lead 56 from flip-flop 50 is connected to an input of an exclusive OR gate 156. An output of amplitude limiter 16 is supplied on a lead 158 to the second inputs of each of exclusive OR gates 112 and 156. Exclusive OR gate 112 has positive and negative outputs on leads 159 and 160, respectively, with lead 159 being supplied to integrating circuit 150. The lead 160 is supplied to an integrating circuit 162. The exclusive OR gates 112 and 156 along with the integrating circuits 150 and 162 and the data derandomizer 138 are part of a data detection circuit generally designated as 164. An output lead 166 from the positive differentiating circuit is supplied to a second input of OR gate 146 as well as being supplied to a delay circuit 168 whose output is supplied to a second input of the integrating circuit 162. Lead 166 is also supplied via a lead 170 to a clock input of a storage flip-flop 172.

Exclusive OR circuit 156 contains only a positive exclusive OR output indication on a lead 174 which is supplied to each of the integrating circuits 150 and 162. An output of integrating circuit 150 is supplied on a lead 176 to a threshold detector 178. An output of threshold detector 178 is supplied to storage means 154 in its original form and is inverted through a NAND gate 180 to a second input of flip-flop 154. An output of integrating circuit 162 is supplied on a lead 182 to a threshold detector 184 whose output is supplied to one input of flip-flop 172 and is inverted in a NAND gate and supplied to a second input of flip-flop 172. Outputs of the two flip-flops 154 and 172 are supplied on leads 186 and 188, respectively, to an exclusive OR gate 190. An output of exclusive OR gate 190 is supplied to a second input of data derandomizer 138 whose output appears on lead 192 as the data output for the demodulating apparatus.

An output of OR gate 146 is supplied through a one-shot 194 to a second input of the AND gate 132.

Figure 2:
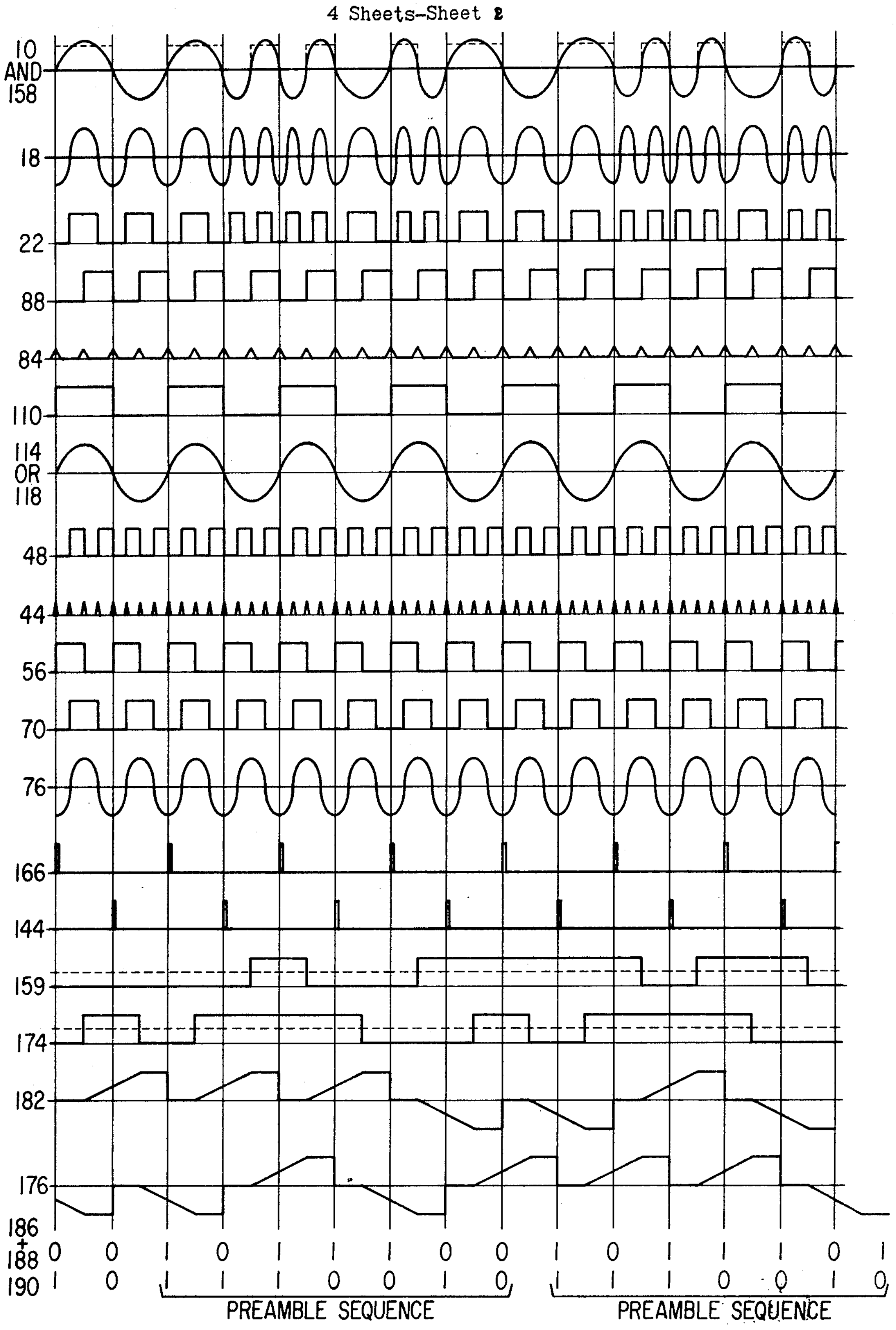
FIGS. 2 and 3 are waveforms utilized in describing the operation of the embodiment of FIG. 1.
Figure 3:
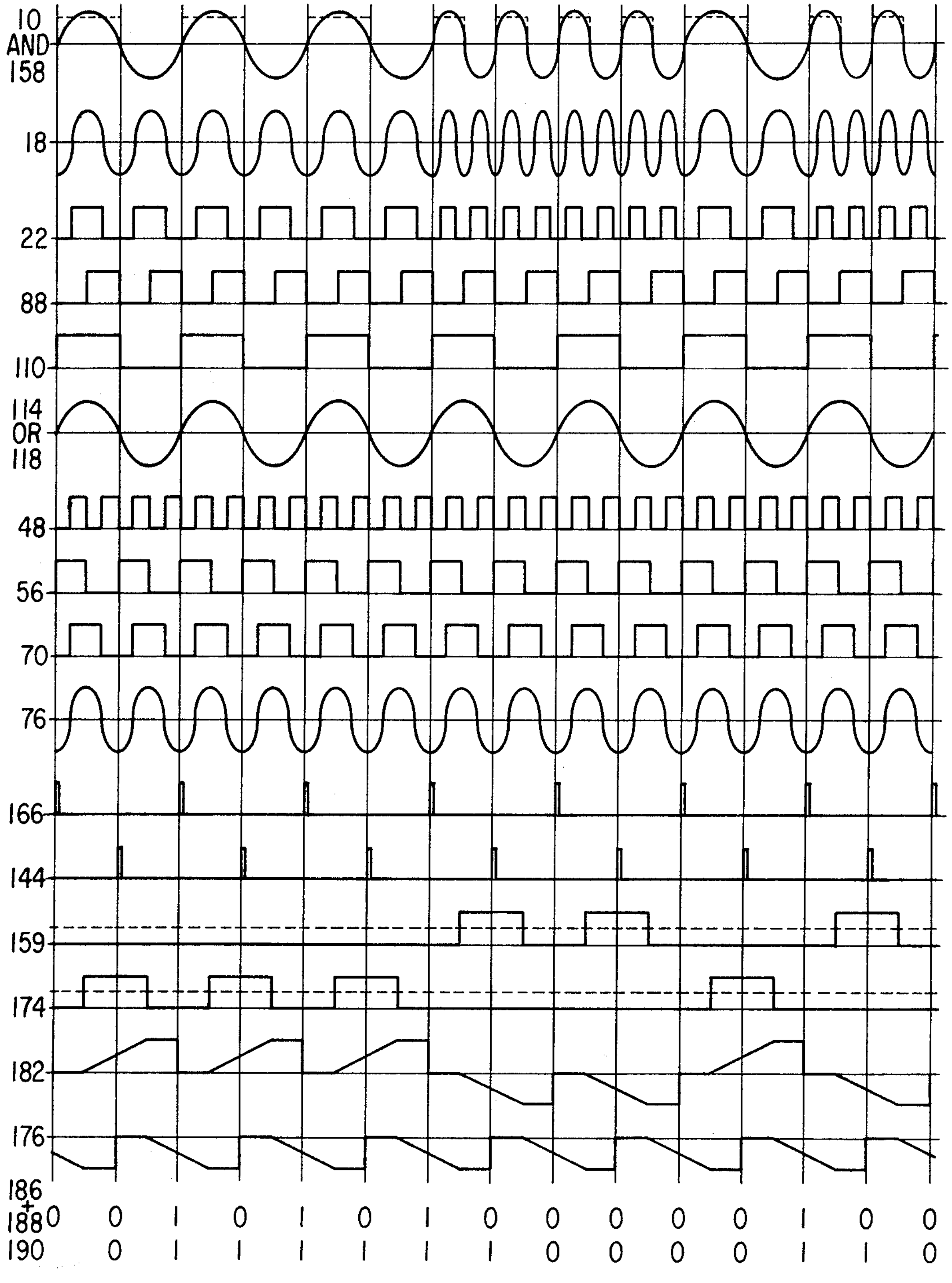

The waveforms of FIGS. 2 and 3 are labeled in accordance with the numerical designation of the place that that waveform appears in the circuit diagram of FIG. 1. In other words, the first waveform of FIG. 2 is labeled 10 and 158. The 10 designation refers to the solid line waveform of the input signal appearing on input 10 while the designation 158 refers to the dash line signal which is the amplitude limited version of the input waveform. The designation 114 or 118 in FIG. 2 refers to the fact that the waveform shown appears at 114 but the waveform appearing at lead 118 is identical thereto in form and thus is numbered in the alternate rather than duplicate the waveform. The waveform shown as 159 in FIG. 2 is the inverse of the waveform appearing on line 160 and both are representative of the exclusive OR combination of the signals on leads 158 and 110. In the lower portion of FIG. 2 a series of zero and one designations are labeled 186 and 188. These designations refer to the binary values appearing alternately on the lead 186 and 188 to be combined in the exclusive OR gate 190. The last line of FIG. 2 is the output data obtained from the exclusive OR gate 190.

OPERATION

As a brief summary of operation, an input signal, which has a center frequency in one embodiment of 1,800 Hz, is modulated in frequency on either side of the center frequency before being applied to a carrier and transmitted. It is then received by a receiver and demodulated to be supplied to the detector portion of the receiver. The optimum performance obtainable in minimum shift keying is to have the frequency shift one-fourth of the data rate. Therefore, if a 2400 bit per second data rate is utilized, the center frequency of 1,800 Hz is modulated between 1,200 and 2,400 Hz or ±600 Hz. In the embodiment shown, one-half cycle of the 1,200 Hz signal is utilized to represent a bit of information such as MARK while a full cycle of a 2,400 Hz signal is utilized to represent a SPACE.

The modulated signal is then squared in 14 to remove random phase modulation and amplitude limited before being applied to a pair of phase locked loops. The phase locked loops are designed so that one will lock onto the upper frequency and the other will lock to the lower frequency. The signal frequency is doubled in the VCO's of the one phase locked loop so that one will operate at 4,800 Hz while the other will operate at 9,600 Hz. The output of the VCO's is then divided by two and multiplied by the signal on 22 in exclusive OR circuits 24 and 26 to obtain sum and difference frequencies of which only the difference frequency passes the LPF to control the VCO. These phase lock loop outputs are then divided down to the 1,200 and 2,400 Hz rates and the two signals are combined in a multiplier 78 with the difference frequency being passed through the bandpass filter 118. The 1,200 Hz difference frequency is then utilized to provide timing signals to the integrators 150 and 162. Meantime, the original input signal has been amplitude limited and supplied to the exclusive OR gates 112 and 156 and logically combined with the 1,200 and 2,400 Hz signals from the phase lock loops 34 and 36. The output of these exclusive OR functions are supplied to the integrators previously mentioned. Periodically, the integrators are sampled by the threshold detectors which will set the flip-flops 154 and 172 to a logic one or logic zero condition, depending upon whether the integrators have integrated to a positive or negative value with respect to a reference. The exclusive OR gate 190 then takes the outputs of these two flip-flops and logically combines the last received data with the presently received data to obtain an output indicative of the transmitted MARK or SPACE.

Referring the circuitry of FIG. 1 to the waveforms of FIG. 2, it may be noted that the input signal appears in FIG. 2 as a variable frequency sine wave adjacent designator 10. It is then amplitude limited to provide the dash line output shown of 158. As will be noted, only the positive portions of the input signal are supplied by amplitude limiter 16 to the exclusive OR gates 112 and 156. The next line shows the effect of multiplying or frequency doubling the signal in line 18 and amplitude limiting it on line 22. Again, the amplitude limiter removes the negative portions of the signal and squares the positive portions.

It may be ascertained from the drawings that a preamble is utilized of logical 1110010 and that this preamble is repeated in FIG. 2 for the purpose of showing the waveforms. In FIG. 3 a lower frequency is illustrated and this preamble is only provided once. The phase detectors 24 and 26 compare the incoming signal with the signal which is being fed back on leads 48 and 88, respectively, and if they are exactly 90° out-of-phase will provide a symmetrical signal to the low-pass filters 40 and 80. However, if the two inputs are not exactly 90° out-of-phase, there will be a DC component. The low-pass filters 40 and 80 will pass only the DC component to the VCO to correct its frequency such that the outputs of these two VCO's are exactly at four times the original input sideband frequency. The outputs of the VCO's are shown as signals 44 and 84. The output of the lower PLL is shown as signal 88 which, as will be noted, is 90° out-of-phase with respect to the 2,400 Hz portion of the input signal to the phase lock loop as shown in waveform 22. The same general comments apply to the upper phase lock loop 34. It will be noted that the upper phase lock loop contains an extra flip-flop as compared to the lower phase lock loop.

If the signal at 110 is filtered to produce the signal at 114 it will have the general form $S_4 = \sin[(\omega_{1200}+\omega_\Delta)t+\Phi]$, where $\omega_{1200}$ is the frequency of the main signal, $\omega_\Delta$ is the doppler offset and $\Phi$ is an arbitrary phase shift. If the signal appearing on lead 56 were filtered in the same way and multiplied with the signal on lead 114, the resulting signal from the output of filter 118 would be a cosine function and the clock would be $\pi/2$ radians out of phase with the data. To avoid this problem, thesecond flip-flop 66 generates an output on lead 70 which is in quadrature with the signal on lead 56 and is filtered giving $S_{76} = -\cos[(\omega_{2400}+\omega_\Delta)t+\Phi]$. ($S_{76}$ equates to the signal on lead 76.) Upon mixing and filtering around 1,200 Hz in the multiplier 78 and the bandpass filter 118, the resulting signal is $S_{118} = \sin\omega_{1200}t$. The filtered output signal may be represented by the waveform labeled 118. If this signal is now amplitude limited, and supplied to differentiating circuits 124 and 126, data clock pulses shown as 144 and 166 may be obtained as shown. The NAND gate 142 is used to invert the output from the negative differentiator 126. The negative differentiator is used to obtain the output from the falling edge of the amplitude input signal while the positive differentiator obtains an output from the leading edge. Since these two outputs are opposite in direction, the inverter 142 is required. These signals on leads 144 and 166 are applied directly to the sample and hold flip-flops 154 and 172, respectively, so that the output from the integrators 150 and 162 may be stored. Then, the contents of the integrators 150 and 162 are dumped. This delay in dumping is accomplished by the delay circuits 148 and 168. Since there is a possibility that the integrators could be dumped before a satisfactory store is obtained, the delay circuits are desirable, although not absolutely necessary.

The purpose of the carrier detect and the data rate control lines will be discussed later. However, thus far the various signals to the data detection circuit have been discussed. As will be noted from the appropriate lines of FIG. 2, the input to the data detection circuit on lead 158 is a clipped version of the input sine wave signal. This signal constitutes one of the inputs to each of the exclusive OR gates 112 and 156. The second input to exclusive OR gate 112 is the signal labeled 110. As will be noted from waveform 159, the output is the logical exclusive OR combination of these two input signals. The output appearing on lead 160 is not shown but is the inverse of waveform 158. The waveform 174 is the logical exclusive OR output resulting from the inputs on lines 158 and 56. As may be ascertained, the integration of the incoming waveforms 159 and 174 to the integrator 150 will produce the waveform as shown in waveform 176. As will be noted, the integrator will provide a changing output only when the two inputs are at the same potential. When they are at different potentials they cancel each other and there is no change in the output. At the time of occurrence of the pulses shown in waveform 144, the flip-flop 154 will record the contents of the integrator 150 via the threshold detector 178. As shown, this results in a logic 0 for the first two occurrences of the pulse on lead 144 with a logic 1 occurring on the third occurrence of said pulse. As will be noted, these outputs are shown as the second, fourth, and sixth values in the waveform labeled 186 and 188. Intermediate these samplings there are samplings of the integrator 162 by the flip-flop 172. As will be realized, but not shown, the delay circuits 148 and 168 cause the integrators to dump their contents and return to zero a minutely delayed time after the sampling has occured. Thus, the integrators can commence integrating the new inputs.

It will be realized that the flip-flops 154 and 172 are not concerned with the amplitude of the signal stored in the integrator but merely whether it has integrated to a positive or negative value with respect to a reference.

The exclusive OR circuit 190 combines the two inputs on each occasion to produce the output binary values indicated as 190. Each of the flip-flops will hold its output for two exclusive OR combinations so that the output of the exclusive OR is always the logically exclusive OR combination of the presently detected data with the last detected data.

Returning to the integrators 150 and 162, it will be noted that the output of integrator 150 is as folows:

$$V_{176} = \int \overline{(S \oplus A)} + (S \oplus B)dt$$

The output of the integrator 162 is as follows:

$$V_{182} = \int (S \oplus A) + (S \oplus B)dt$$

As will be noted, the output shown in waveform 190 corresponds directly in a delayed format with the signal supplied in MARK/SPACE designations on the input as shown in waveform 10.

Referring now to the carrier detect circuit 38, it will be noted that there are 90° phase shifters between the outputs of the phase lock loops and the phase detectors 28 and 30. As previously indicated, the output of the phase detectors 24 and 26 provide a zero output signal when the system is locked at the proper frequency. By inserting the 90° phase shift, the two phase detectors 28 and 30 will provide maximum output when the two phase locked loops are locked to their respective sidebands. Thus, the filtering by the low-pass filters 96 and 104 will provide a maximum DC signal to the threshold detectors which provides an output as combined in the AND gate 100 on lead 102 to indicate to further apparatus that the system is apparently locked and ready to provide correct data. If the threshold detectors 98 and 106 are set a high enough level, there will be no output until both phase lock loops are locked exactly to the frequency of the incoming sideband signals.

The present invention can also be used at a 1,200 Hz data rate where a MARK occupies the time of a full cycle of 1,200 Hz and two cycles of 2,400 Hz. Normally, slowing the data rate in minimum shift keying to half the previous data rate will result in a three DB improvement in signal-to-noise ratio. However, there is no such improvement if the data rate is reduced to half without a corresponding reduction in modulated frequency shifts (as an example reducing the center frequency to 900 Hz and the two sidebands to 600 and 1,200 Hz). However, the present invention will operate at the lower data rate and the waveforms of FIG. 3 have been provided to illustrate the operation thereof. As will be noted, the operation is substantially the same except that the signal is duplicated in various places such as the fact that the integrators will integrate to the same value twice for each MARK and each SPACE and thus there is a duplication of the data appearing on lead 190. Thus, compensation will be required to sample only half as often as sampling would occur for the 2,400 Hz data rate. A data rate control lead is shown as lead 130 to utilize the 1,200 Hz rate directly from amplitude limiter 120 through the AND gate 128 in the 1,200 Hz condition to produce the receive clock 136. For normal 2,400 Hz operation, the OR circuit 146 is used to supply the pulses on leads 144 and 166 to a one-shot which has a delay time equal to approximately one-half the 2,400 Hz rate. While not shown, the receive clock appearing on 156 is substantially the same as waveform 56 of FIG. 2 and in the 1,200 data rate configuration the output waveform on 136 is substantially the same as waveform 110 of FIG. 3.

The low data rate or 1,200 Hz data rate of FIG. 3 requires twice the space to show and thus only a single preamble has been shown in illustrating the waveforms as opposed to the duplication of the preamble in FIG. 2 for the high data rate.

In summary, the present invention is directed toward a data detection system utilizing the frequency difference between the sidebands of a minimum shift keyed signal to provide the synchronizing or clock frequency utilized in detecting the data from the incoming signal. Thus, the presently disclosed circuit of FIG. 1 is only one possible implementation of the present invention and we wish to be limited not by the embodiment shown but only by the scope of the appended claims wherein,

We claim:

1. Frequency shift keyed signal receiver apparatus of the class described comprising, in combinatio:

input means for supplying received frequency shift keyed signals representative of MARK and SPACE data;

first detection means connected to said input means for detecting the frequency difference between MARK and SPACE data signals and supplying a clock output representative of the frequency difference; and second detection means connected to said input means and said first detecton means for receiving said frequency shift keyed signals and said clock output therefrom, said second detection means providing binary logic apparatus output signals indicative of MARK and SPACE data.

2. Apparatus as claimed in claim 1 wherein said first detection means includes:

first and second phase locked loops each locked to one of said MARK and SPACE data frequency shift keyed signals; and means connected to outputs of said first and second phase locked loops for combining and filtering the phase locked outputs thereof to provide the clock output indicative of the MARK and SPACE difference frequency.

3. Apparatus as claimed in claim 2 wherein said second detection means includes:

first and second exclusive OR gates connected for receiving said received frequency shift keyed signals representative of MARK and SPACE data from said input means and for receiving output signals from said first and second phase locked loops and providing outputs indicative of the exclusive OR logical combination thereof;

integration means connected to said exclusive OR means and to said first detection means for receiving the logically combined clocked outputs thereof;

storage means connected to said integration means for periodically storing the integrated amplitudes; and logic combining means connected to said storage means for logically combining said stored signals representaitve of MARK and SPACE data for providing said binary logic apparatus output signals.

4. Apparatus as claimed in claim 3 wherein said input means amplitude limits signals supplied to said exclusive OR means and squares and amplitude limits the signals supplied to said first and second phase locked loops.

5. Receiver apparatus of the class described comprising, in combination:

input means for supplying received frequency shift keyed signals representative of MARK and SPACE data;

first detection means connected to said input means for detecting the sideband frequency difference and supplying a clock output representative of the frequency difference; and second detection means connected to said input means and said first detection means for receiving said frequency shift keyed signals and said clock output therefrom, said second detection means providing apparatus output signals indicative of the MARK and SPACE data.

6. Apparatus as claimed in claim 5 wherein said first detection means includes:

first and second phase locked loops each locked to one of the sideband frequencies; and means connected to outputs of said first and second phase locked loops for combining and filtering the phase locked outputs thereof to provide the clock output indicative of the difference in sideband frequencies.

7. Apparatus as claimed in claim 5 wherein said second detection means includes:

first and second exclusive OR gates connected for receiving said received frequency shift keyed signals representative of MARK and SPACE data from said input means and for receiving output signals from said first and second phase locked loops and providing outputs indicative of the exclusive OR logical combination thereof;

first and second integration means connected to said first and second exclusive OR means and to said first detection means for receiving the logically combined outputs thereof;

storage means connected to said first and second integration means for periodically storing the polarity of the integrated amplitudes; and logic combining means connected to said storage means for logically combining the stored polarity signals representative of MARK and SPACE data for providing the apparatus output signals.

8. Apparatus as claimed in claim 5 wherein said input means amplitude limits signals supplied to said second detection means and squares and amplitude limits the signals supplied to said first detection means.

* * * * *